C. GABEL.
FORCEPS.
APPLICATION FILED DEC. 17, 1915.
1,207,892.
Patented Dec. 12, 1916.
2 SHEETS—SHEET 1.
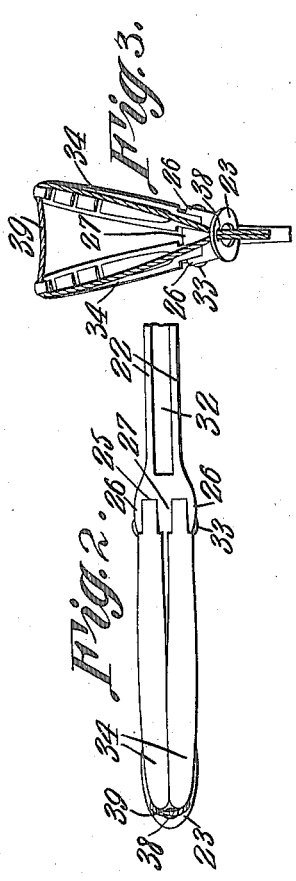
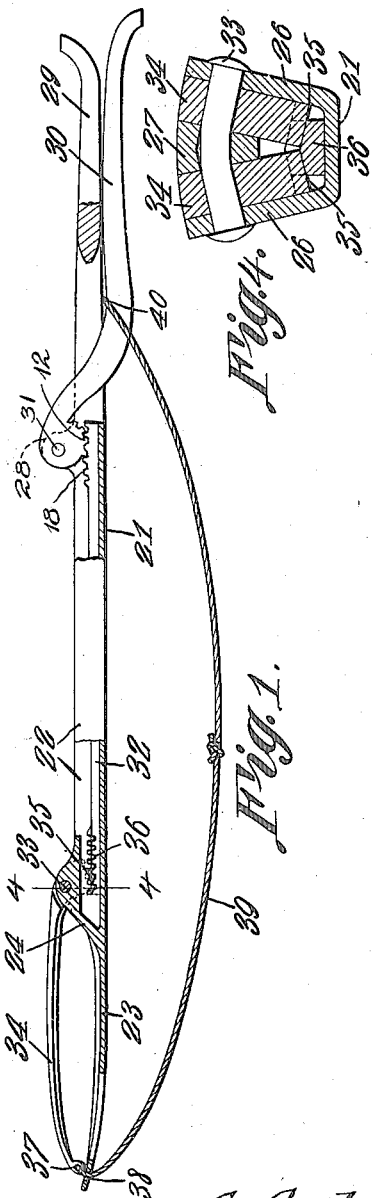

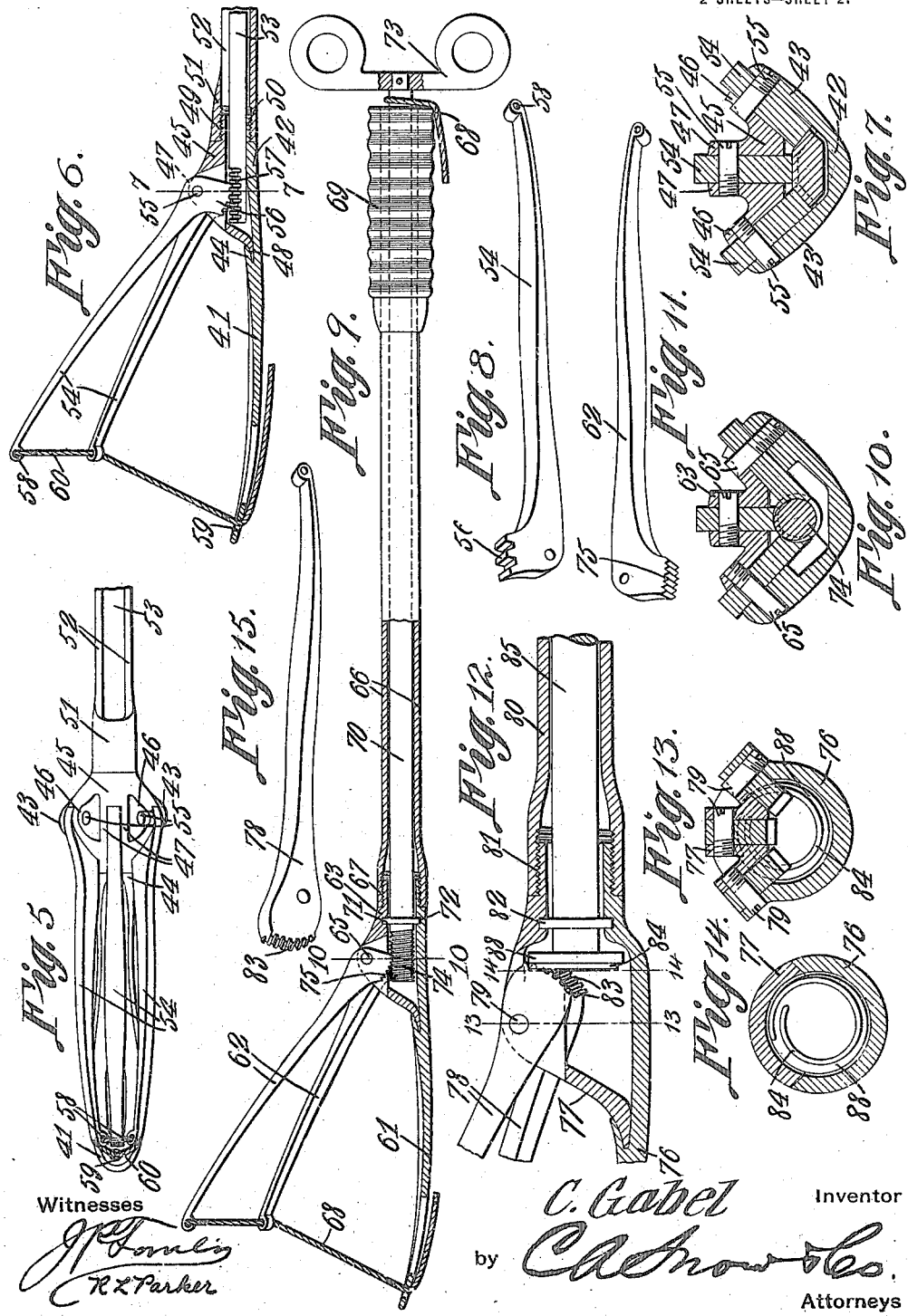

UNITED STATES PATENT OFFICE.

CHARLES GABEL, OF HAWKEYE, IOWA.

FORCEPS.

1,207,892. Specification of Letters Patent. Patented Dec. 12, 1916.

Application filed December 17, 1915. Serial No. 67,436.

*To all whom it may concern:*

Be it known that I, CHARLES GABEL, a citizen of the United States, residing at Hawkeye, in the county of Fayette and State of Iowa, have invented new and useful Forceps, of which the following is a specification.

The device forming the subject matter of this application is a pair of delivery forceps adapted to be used primarily in aiding domestic animals in giving birth to young.

Essentially, the object of the present invention is to provide a pair of delivery forceps embodying a fixed jaw and a plurality of movable jaws, the free ends of the latter being adapted to move transversely in converging planes toward a common point as they pass to a closed position.

The invention contemplates the combination with a plurality of movable jaws of the sort above mentioned, of a flexible loop of novel form constituting an effective adjunct to the jaws in the operation of delivery.

As a general statement of advantage and improvement, the invention proposes to obviate the many disadvantages peculiar to delivery forceps of the bulky, cumbersome and more or less inefficient crossed-lever type.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings: Figure 1 is a sectional side elevation showing a pair of forceps embodying the invention; Fig. 2 is a fragmental top plan of the structure shown in Fig. 1; Fig. 3 is an end elevation of the structure shown in Figs. 1 and 2; Fig. 4 is a cross section on the line 4—4 of Fig. 1; Fig. 5 is a fragmental plan showing a modified form of the invention; Fig. 6 is a longitudinal section of the structure shown in Fig. 5; Fig. 7 is a cross section on the line 7—7 of Fig. 6; Fig. 8 is a perspective showing one of the jaws applied in that form of the invention delineated in Fig. 6; Fig. 9 is a sectional side elevation showing a modified form of the invention; Fig. 10 is a cross section on the line 10—10 of Fig. 9; Fig. 11 is a perspective depicting one of the jaws shown in Fig. 9; Fig. 12 is a fragmental longitudinal section showing a modified form of the invention; Fig. 13 is a cross section on the line 13—13 of Fig. 12; Fig. 14 is a cross section on the line 14—14 of Fig. 12; Fig. 15 is a perspective showing one of the jaws used in that form of the invention which appears in Fig. 12.

Since the device is comparatively simple, this specification may profitably be opened with a general description of the structure and its operation, details being described subsequently. Noting Figs. 1, 2, 3 and 4, it will be understood that the instrument is inverted from the position of Fig. 1, so that the fixed jaw 23 becomes the upper jaw, the jaws 34 in a closed condition, being inserted into the womb. Owing to the position of the pelvic bone, and because the young lie on the bottom of the womb, it is desirable that the jaws 34 open downwardly. The jaws 34 are operated by swinging the movable handle 30, the pinion 12 on the handle meshing into the rack 18, the bar 32 being moved endwise, and the rack 36 on the bar operating the jaws 34 through the instrumentality of the pinions 35. The handle 9 lies well outside of the body of the animal and consequently there is no danger of pinching the parts. The end wall 24 acts as a guard which prevents either the young or some part of the mother from being bruised or torn by engagement with the pinions 35 and the rack 36.

Having thus described the invention generally, and passing to details, it will be understood that in the form of the invention which is disclosed in Figs. 1, 2, 3 and 4 there appears a shank 21 of trough-shape and embodying side walls 22, the shank 21 terminating at its forward end in a fixed jaw 23 which forms the upper jaw when the device is in operation. An end wall 24 connects the side walls 22 adjacent the jaw 23. Adjacent the jaw 23, the shank 21 is slotted longitudinally as shown at 25, to define side ears 26 and an intermediate rib 27. Between its ends, the shank 21 is supplied with ears 28. The rear end of the shank 21 forms a fixed handle 29. A movable handle 30 is shown, the same being mounted to swing on a pivot pin 31 carried by the ears 28.

An actuating member 32 in the form of a bar is mounted to slide in the shank 21 and is moved by the handle 30 through the instrumentality of the rack 18 on the bar 32, and a pinion 12 on the handle 30.

In the form of invention under discussion, a pair of movable jaws 34 coact with the fixed jaw 23, the movable jaws 34 lying between the side ears 26, and being separated by the rib 27. The movable jaws 34 swing on a pivot element 33 carried by the ears 26 and the rib 27, the movable jaws being supplied with pinions 35 meshing into a rack 36 on the forward end of the actuating member or bar 32. It is to be observed that, as shown in Fig. 4, the jaws 34 are not parallel, but are acutely disposed with respect to each other, the rack 36 and the pinions 35 being shaped accordingly. In this form of the invention and in the forms to be described hereinafter, wherein more than one movable jaw is employed, the free ends of the movable jaws separate transversely of the instrument, when they are moved to open positions, as shown in Fig. 3. However, when the jaws move into a closed position, as indicated in Fig. 2, the jaws become approximately parallel. The jaws 34 near their free ends are provided with openings 37 through which is threaded a flexible loop 39, both strands of which pass through a single opening 38 in the fixed jaw 23, as shown clearly in Fig. 3. If desired, for convenience in operation, the loop 39 may be engaged as shown at 40 across the movable handle 30. When the jaws 34 are open, the loop 39 is drawn taut and acts as a guard which prevents parts of the womb from being engaged by the jaws, the young, only, passing through that portion of the loop shown in Fig. 3 and entering within the contour of the jaws.

As shown in Figs. 5, 6, 7 and 8, there appears a fixed jaw 41 having a trough-shaped extension 42 defining outer ears 43. The jaw 41 is provided with an overhanging lip 44 best seen in Fig. 6. Disposed between the outer ears 43 is a filler 45 embodying outer ears 46 and intermediate ears 47, the forward end of the filler 45 being provided with an extension 48 adapted to be slipped beneath the lip 44 on the fixed jaw 41. The filler 45 terminates in a threaded, trough-shaped stem 49 coöperating with a similar threaded stem 50 constituting a part of the jaw 41, these stems coacting to form a tube. Onto the tube thus formed is threaded a socket 51 fashioned at the forward end of a trough-shaped member 52 through which the actuating element 53 slides, the same being operated by such mechanism as the handle 30 hereinbefore described and shown in Fig. 1. In this form of the invention, three movable jaws 54 are provided, the same being located respectively between the ears 46—43 and 47—47, as will be understood from Fig. 7, the jaws being mounted to swing on pivot element 55 carried by the ears. The free ends of the jaws spread apart, transversely of the instrument, as the jaws are opened and close together, transversely of the instrument, as the jaws move into closed position, that is, into parallelism with the fixed jaw 41. The jaws 54 are provided with pinions or segments 56 meshing into a rack 57 formed on the forward end of the actuating element 53, the teeth of the rack being so fashioned as to engage simultaneously with all of the pinions or segments of the three movable jaws. The jaws 54 are provided adjacent their ends with openings 58 through which is threaded a flexible loop 60, both strands of the loop being passed through an opening 59 in the fixed jaw 41, the construction under consideration being similar to that hereinbefore described and shown in Figs. 3 and 1. Although the trough-shaped member 52 and the fixed jaw 41 are separable in this form of the invention, the part 52 may be described as a shank provided with a fixed jaw.

The structure shown in Figs. 9, 11 and 10 resembles so closely the structure shown in Figs. 5, 6 and 7, that the description may be shortened greatly. In Figs. 9, 11 and 10, the fixed jaw is shown at 61 and the movable jaws at 62, the filler being shown at 63 and the pivot elements for the jaws 62 appearing at 65. The shank 66 is threaded as shown at 67 onto the filler 63 and onto the rear end of the fixed jaw 61. The flexible loop is shown at 68. The distinguishing characteristics of this form of the invention will now be discussed. The shank 66 preferably is of tubular form and carries a grip 69. The actuating member 70 instead of moving endwise, is mounted for rotation and is held against longitudinal movement, the actuating member being provided adjacent its forward end with a circumscribing rib 71 journaled in recesses 72 fashioned in the back portion of the fixed jaw 61 and in the filler 63. The exposed rear end of the actuating member 70 is provided with a finger piece 73, the forward end of the actuating member terminating in a screw 74 meshing into threads 75 on the jaws 62. Obviously by rotating the actuating member 70 through the instrumentality of the finger piece 73, the screw 74 meshing into the threads 75 on the jaws 62, will move the jaws to and from closed positions.

As shown in Figs. 12, 13, 14 and 15, the fixed jaw appears at 76 and the filler at 77. The numeral 78 indicates the movable jaws of which there are preferably three, the pivot elements for the movable jaws being shown at 79. The numeral 80 indicates a tubular shank threaded as shown at 81 onto the fixed jaw 76 and onto the filler 77. An actuating member 88 is rotatable in the shank and is held against longitudinal movement by a circumscribing rib 82 coacting with the filler and with the fixed jaw, as hereinbefore set forth. In this form of the invention, the threads 83 are not fashioned upon the inner edges of the jaws, as shown at 75 in Fig. 11, but are fashioned on the ends of the jaws. The end face of the actuating member 85 is provided, as shown in Fig. 14 with a spiral rib 84 adapted to coact with the threads 83 on all of the jaws. The actuating member 85 preferably is rotated by means of such a structure as that shown at 73 in Fig. 9, and the movable jaws and the fixed jaw may carry a loop such as that shown at 68.

Having thus described the invention, what is claimed is:—

1. An instrument of the class described embodying a shank provided at one end with a fixed jaw; a plurality of shank carried pivoted jaws, the bases of which are angularly disposed whereby as the free ends of the movable jaws move toward the fixed jaw, the said free ends of the movable jaws are moved transversely in converging planes toward the fixed jaw; and means for actuating all of the movable jaws at once.

2. An instrument of the class described embodying a shank provided at one end with a fixed jaw; a plurality of shank carried pivoted jaws, the bases of which are angularly disposed whereby as the free ends of the movable jaws move toward the fixed jaw, the said free ends of the movable jaws are moved transversely in converging planes toward the fixed jaw; and means housed within the shank and accessible from the other end of the shank for manipulating the movable jaws.

3. An instrument of the class described embodying a shank provided at one end with a fixed jaw; a plurality of shank carried pivoted jaws, the bases of which are angularly disposed whereby as the free ends of the movable jaws move toward the fixed jaw, the said free ends of the movable jaws are moved transversely in converging planes toward the fixed jaw; means for actuating all of the movable jaws at once; and a flexible loop engaged with the jaws.

4. An instrument of the class described embodying a shank provided at one end with a fixed jaw; a plurality of shank carried pivoted jaws, the bases of which are angularly disposed whereby as the free ends of the movable jaws move toward the fixed jaw, the said free ends of the movable jaws are moved transversely in converging planes toward the fixed jaw; a flexible loop assembled with the jaws; and means housed within the shank and accessible from the other end of the shank for manipulating the movable jaws.

In testimony that I claim the foregoing as my own, I have hereto affixed my signature in the presence of two witnesses.

CHARLES GABEL.

Witnesses:
H. P. BEKOHNE,
CHR. G. DANDEL.